United States Patent [19]
Holcomb

[11] 4,085,358
[45] Apr. 18, 1978

[54] REGULATED DC TO DC POWER SUPPLY WITH AUTOMATIC RECHARGING CAPABILITY

[75] Inventor: Stanley W. Holcomb, Richardson, Tex.

[73] Assignee: Texas Instruments Incorporated, Dallas, Tex.

[21] Appl. No.: 641,786

[22] Filed: Dec. 29, 1975

[51] Int. Cl.² .............................................. H02J 7/00
[52] U.S. Cl. .............................. 320/9; 320/14; 320/39; 323/DIG. 1; 363/16
[58] Field of Search ............... 323/DIG. 1, 17; 321/2, 321/45 ER; 320/21, 2, 3, 5, 9, 14, DIG. 1, 23, 39; 307/11, 151, 66; 363/16–26

[56] References Cited

U.S. PATENT DOCUMENTS

| | | | |
|---|---|---|---|
| 2,791,739 | 5/1957 | Light | 363/19 |
| 2,920,259 | 1/1960 | Light | 321/45 ER |
| 2,920,260 | 1/1960 | Goffstein | 320/2 |
| 3,293,445 | 12/1966 | Levy | 320/DIG. 1 |
| 3,430,059 | 2/1969 | Wolff | 320/2 |
| 3,566,242 | 2/1971 | Williams | 320/21 |
| 3,671,842 | 6/1972 | McKeown | 323/DIG. 1 |
| 3,743,920 | 7/1973 | Ubillos | 307/151 |
| 3,775,659 | 11/1973 | Carlsen | 321/2 |
| 3,816,804 | 6/1974 | Cardwell | 323/DIG. 1 |
| 3,919,625 | 11/1975 | Barton | 323/DIG. 1 |
| 3,965,409 | 6/1976 | Klautschek | 323/DIG. 1 |
| 4,021,717 | 3/1975 | Furuishi et al. | 363/19 |

FOREIGN PATENT DOCUMENTS

| | | | |
|---|---|---|---|
| 2,234,121 | 2/1973 | Germany | 323/DIG. 1 |
| 2,353,345 | 5/1974 | Germany | 321/2 |
| 1,273,019 | 5/1972 | United Kingdom | 320/39 |

*Primary Examiner*—William H. Beha, Jr.
*Attorney, Agent, or Firm*—James T. Comfort; Rene' E. Grossman; Richard P. Berg

[57] ABSTRACT

A DC to DC power supply, which includes simplified semiconductor circuitry and has features enabling the semiconductors to become non-conducting when the output is unloaded or causing battery connected to the input to charge when a higher than normal output voltage is applied to the circuit output.

45 Claims, 5 Drawing Figures

REGULATED DC TO DC POWER SUPPLY WITH AUTOMATIC RECHARGING CAPABILITY

This invention relates to semiconductor DC to DC power supplies. As is well known to those skilled in the art, successive improvements in DC to DC power supply circuits have resulted in the highly compact power supply circuits which are utilized in modern battery-operated, handheld appliances, such as the handheld electronic calculator. These circuits are necessary because the voltages needed to operate the logic cicuitry and display devices of these calculators are often higher than that which can be supplied directly by a small number of standard size batteries. This is especially true if the appliance is to utilize rechargeable batteries, which typically supply only 1.25 volts each while certain display devices may require as much as 30 volts to be operable.

DC to DC power supply circuits have been relied upon to step-up the available battery voltages to the voltage or voltages necessary to operate the appliance rather than significantly increasing the size and weight of the appliance to accommodate the number of batteries otherwise necessary. DC to DC power supply circuits typical of the prior art are depicted in FIGS. 1, 2 and 3. Each of these circuits display certain deficiencies or drawbacks which would make their substitution for a larger number of batteries an undesirable choice if it were not for the overriding savings in space and weight. These include: (1) lack of capability for automatic recharging of a battery connected at the input when a higher than nominal output voltage is applied at the output, (2) high current drain on the battery, even when unloaded, so as to require the power supply to be switched off during nonoperation lest it rapidly discharge the battery and (3) the use of either a large number of components or complicated components with attendant lessened reliability and increased cost.

It is one general object of the invention to improve DC to DC power supply circuits.

It is another object of the invention to simplify DC to DC power supply circuits.

It is yet another object of the invention to be able to markedly reduce the current demands made by the circuit when desired output voltage is attained and the circuit output is unloaded.

It is still another object of the invention to be able to automatically regulate the level of direct current voltage developed at the circuit output.

It is yet another object of the invention to provide for automatic recharging of a battery connected at the circuit input when a higher than nominal output voltage is applied at the output.

In accordance with one feature of the invention, power supply reliability is improved and cost is decreased by utilizing a small number of simple components.

In accordance with another feature of the invention, the current demands made by the circuit after the desired output voltage is attained when the output is unloaded can be markedly reduced by biasing the circuit switching semiconductors into a non-conducting state.

In accordance with another feature of the invention, automatic recharging of a battery connected at the input of the circuit is attained by biasing a semiconductor device connected between the output and input of the circuit into conduction when a higher than nominal output voltage is applied at the output.

In accordance with another feature of the invention, the level of direct current output voltage can be regulated.

These and other objects and features of the invention will be evident from the following detailed description with reference to the drawings in which.

Figure 1:
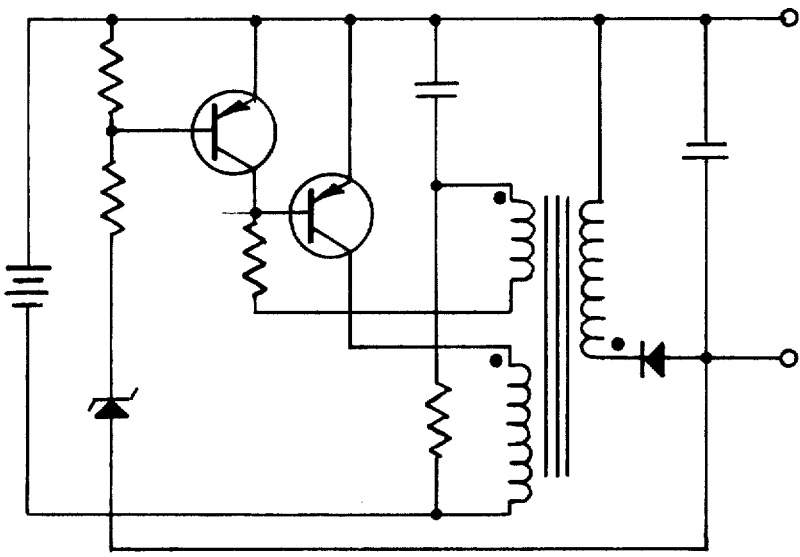
FIGS. 1, 2 and 3 illustrate typically the prior art.
Figure 2:
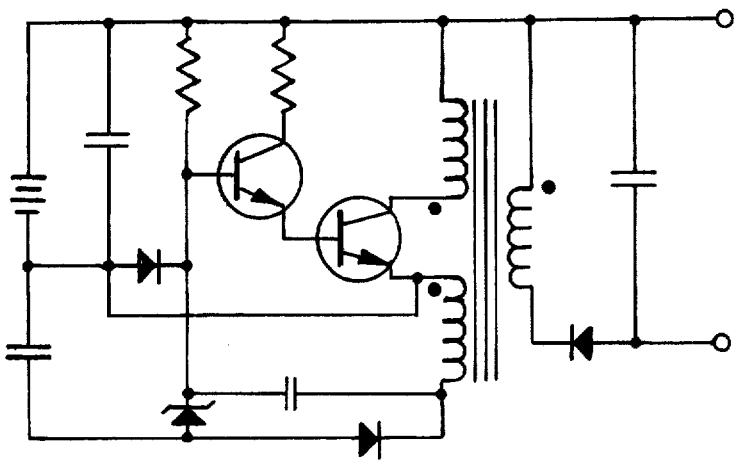
Figure 3:
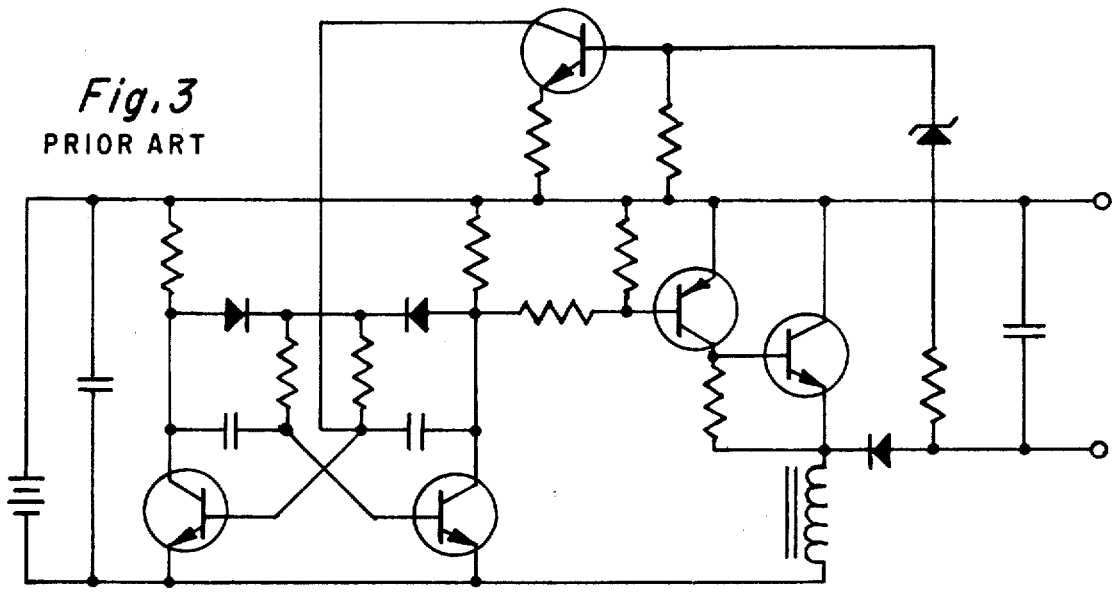
Figure 4:
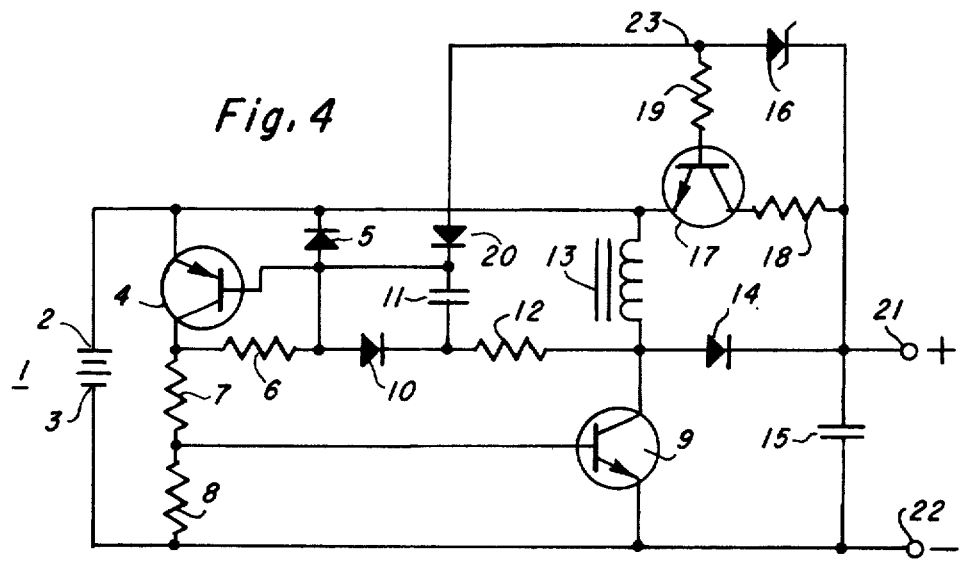
FIG. 4 is a circuit schematic depicting a first embodiment of the invention.

An embodiment of the present invention will be described in connection with FIG. 4 wherein given a battery range between 2.0 to 3.3 volts D.C., the circuit will produce output voltages of 7.5 to 8.5 volts D.C. Although the first embodiment is thusly described, it will be evident to one skilled in the art that other voltage levels could be employed without departing from the principles and spirit of the invention.

In this system, a battery 1 has a positive terminal 2 which is connected to the emitter of transistor 4, to the emitter of transistor 17, by way of a diode 5 to the base of transistor 4 and by way of an inductor 13 to the collector of transistor 9. The negative terminal 3 of the battery 1 is connected to the negative output terminal 22, to the emitter of transistor 9, by way of resistor 8 to the base of transistor 9 and by way of capacitor 15 to the positive output terminal 21. The collector of transistor 4 is connected by way of a resistor 7 to the base of transistor 9 and by way of a resistor 6 to the base of transistor 4. The collector of transistor 9 is connected by way of a diode 14 to the positive output terminal 21 and by way of a resistor 12 to a diode 10 and a capacitor 11 which are wired in parallel and in turn connected to the base of transistor 4. The base of transistor 4 is connected by way of a diode 20 and Zener diode 16 to the positive output terminal 21. The junction between diode 20 and Zener diode 16 is connected by way of resistor 19 to the base of transistor 17. The collector of transistor 17 is connected by way of a resistor 18 to the positive output terminal 21. Transistor 4 is of a complementary conductivity type to transistors 9 and 17.

In operation, the oscillator circuit operates as follows: at the moment the battery is initially connected to the circuit input, transistor 4 is biased into conduction by a current flowing through resistors 6, 7 and 8 from the base of transistor 4. Transistor 9 simultaneously is biased into conduction by the voltage drop occurring across resistor 8 which results from the current flowing through transistor 4. A positive feedback path through resistor 12, capacitor 11 and diode 10 biases transistor 4 further into conduction which in turn biases transistor 9 further into conduction by the action of the increased voltage drop occurring across resistor 8. This positive feedback path causes both transistors 4 and 9 to saturate. While transistor 9 is in saturation its collector current is increasing due to the action of the inductor 13. The collector current will continue to increase, storing energy in the inductor, until the current reaches a value equal to the forward current gain of transistor 9 times the available base current. When this value of collector current is reached, transistor 9 will enter a nonsaturated state and the voltage drop across the collector and emitter terminals of transistor 9 begins to increase. This increasing voltage is fed back to the base of transistor 4 by the feedback circuit consisting of resistor 12 and capacitor 11, causing the base voltage to rise temporarily. Transistor 4 is caused to enter a nonsaturated mode, thus decreasing the transistor's collector current, which in turn decreases the voltage drop across resistor 8. This action causes transistor 9 to further desaturate. Diode 5 is incorporated into the circuit to keep the voltage impressed at the base of transistor 4, when transistor 9 turns off, from exceeding the reverse bias breakdown voltage for the base-emitter junction of transistor 4.

As both devices turn off, the voltage resulting in the inductor by release of the energy stored therein is applied in series with the battery, thus forward biasing diode 14 and allowing capacitor 15 to be charged to a voltage greater than that which the battery could supply alone. As capacitor 11 discharges, the base voltage of transistor 4 again falls, causing transistor 4 to go into conduction and thus repeating the hereinbefore described circuit events in a cyclical manner.

If it were not for the operation of the output voltage regulator circuit, which comprises diode 20 and Zener diode 16, the oscillator circuit hereinbefore described would continue to oscillate, storing energy in the inductor 13 when transistors 4 and 9 were turned on and transferring that energy to the capacitor 15 when the transistors turn off. The frequency at which the oscillator operates is, of course, a function of the values of the circuit components selected.

Now turning to the operation of the output voltage regulator circuit, the characteristics of Zener diode 16 are so selected that when the output voltage, that is, the voltage stored in capacitor 15, reaches the desired value, the breakdown voltage of Zener diode 16 is reached, forward biasing diode 20 and causing the voltage at the base of transistor 4 to increase thus turning off transistor 4, on the average, longer and to a lower current level. This action reduces the base drive to and thus the on duration of transistor 9. Thus the energy being stored in the inductor is reduced to equalize the energy being transferred to and from the capacitor 15. If no energy were being transferred from the capacitor 15, that is, if the output were unloaded, when the desired stored output voltage exists in capacitor 15, the circuit does not oscillate and both transistors 4 and 9 are turned off, resulting in very little drain on the battery. The output voltage regulator circuit does lightly load the circuit, causing the circuit to oscillate occasionally and briefly to maintain the desired output voltage.

When a voltage slightly greater (approximately ½ volt) than the normal output voltage is applied at the output terminals 21 and 22 of the circuit, such as might be supplied by an external AC to DC power supply commonly used to power small handheld appliances when AC current is available, the battery charging circuit comprising transistor 17 and resistors 18 and 19, causes the battery to charge. When the output voltage regulator circuit causes the oscillations to cease, the voltage at node 23 is approximately the same as the battery voltage. When the slightly higher voltage from an external AC to DC power supply is applied to the output terminals, the voltage at node 23 correspondingly attains a value slightly greater than the battery voltage, causing transistor 17 to saturate. Transistor 17 then provides a charging path to the battery through current limiting resistor 18.

A parallel path for recharging the battery would be available through diodes 5 and 20 and Zener diode 16. However, if this path were utilized, the Zener diode would have to be selected to carry the larger currents necessary to recharge the battery. In the preferred embodiment, such a recharging path is not utilized because of the high cost associated with high current capability Zener diodes having close tolerances. The current carrying capability of the Zener diode is assured of not being exceeded so long as the external AC to DC power supply does not apply a voltage exceeding the normal output voltage by more than approximately 1.25 volts, because transistor 17 will go into conduction before diode 5 does as the voltage at node 23 rises above the battery voltage.

If the external AC to DC power supply might supply a voltage exceeding the normal output voltage by more than approximately 1.25 volts, then in another embodiment additional diodes or a resistor could be connected in series with diode 5 to assure that the current carrying capability of the Zener diode is not exceeded.

Figure 5:
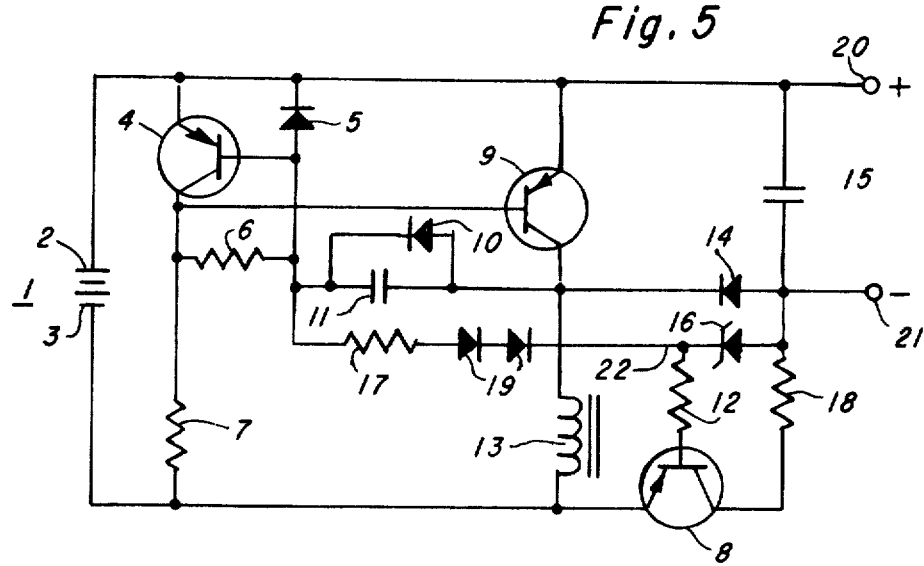
FIG. 5 is a circuit schematic depicting a second embodiment of the invention.

A second embodiment of the present invention will be described in connection with FIG. 5 wherein given a battery voltage between 3.3 to 4.5 volts D.C., the circuit will produce output voltages of 9.6 to 9.75 volts D.C. This embodiment differs from the first embodiment in that this embodiment does not have the feature of markedly reduced current demands when the output is unloaded, but this embodiment exhibits superior output voltage regulation. Although the second embodiment is thusly described, it will be evident to one skilled in the art that other voltage levels could be employed without departing from the principles and spirit of the invention.

In this system, a battery 1 has a positive terminal 2 which is connected to the emitter of transistor 4, to the emitter of transitor 9, by way of a diode 5 to the base of transistor 4, to the positive output terminal 20 and by way of capacitor 15 to the negative output terminal 21. The negative terminal 3 of the battery 1 is connected to the emitter of transistor 8, by way of resistor 7 to the collector of transistor 4 and by way of inductor 13 to the collector of transistor 9. The collector of transistor 4 is connected to the base of transistor 9 and by way of a resistor 6 to the base of transistor 4. The collector of transistor 9 is connected by way of a diode 14 to the negative output terminal 21 and by way of a diode 10 and a capacitor 11 which are wired in parallel to the base of transistor 4. The base of transistor 4 is connected by way of a resistor 17, at least one diode 19 and Zener diode 16 to the negative output terminal 21. The junction between a diode 19 and Zener diode 16 is connected by way of resistor 12 to the base of transistor 8. The collector of transistor 8 is connected by way of a resistor 18 to the negative output terminal 21. Transistors 4, 8 and 9 are all of the same conductivity type.

In operation, the oscillator circuit operates as follows: at the moment the battery is initially connected to the circuit input, transistor 9 is biased into conduction by a current flow through resistor 7 from the base of transistor 9. Transistor 9 promptly saturates because the collector current of transistor 9 is limited by inductor 13 and nearly all of the battery voltage momentarily appears across inductor 13. A feedback path through capacitor 11 and diode 10 biases transistor 4 into a nonconducting node. While transistor 9 is in saturation its collector current is increasing due to the action of the inductor 13. The collector current will continue to increase, storing energy in the inductor, until the current reaches a value equal to the forward current gain of transistor 9 times the available base current. When this value of collector current is reached, transistor 9 will enter a nonsaturated state and the voltage drop across the collector and emitter terminals of transistor 9 begins to increase. This increasing voltage is fed back to the base of transistor 4 by the feedback circuit consisting of diode 10 and capacitor 11, causing the base voltage to fall temporarily. Transistor 4 is caused to enter a conducting mode, thus increasing the collector current of transistor 4, which in turn increases the voltage drop across resistor 7. This action causes transistor 9 to further desaturate. Diode 5 is incorporated into the circuit to keep the voltage impressed at the base of transistor 4 from exceeding the reverse bias breakdown voltage for the base-emitter junction of transistor 4.

As transistor 9 turns off, the voltage resulting in the inductor by release of the energy stored therein is applied in series with the battery, thus forward biasing diode 14 and allowing capacitor 15 to be charged to a voltage greater than that which the battery could supply alone. As capacitor 11 discharges, through resistor 6, the base voltage of transistor 4 again rises causing transistor 4 to turn off and thus repeating the hereinbefore described circuit events in a cyclical manner.

If it were not for the operation of the output voltage regulator circuit, which comprises resistor 17, diode 19 and Zener diode 16, the oscillator circuit hereinbefore described would continue to oscillate, storing energy in the inductor 13 when transistor 9 turns on and transferring that energy to the capacitor 15 when transistor 9 turns off. The frequency at which the oscillator operates is, of course, a function of the values of the circuit components selected.

Now turning to the operation of the output voltage regulator circuit, the characteristics of Zener diode 16 are so selected that when the output voltage, that is, the voltage stored in capacitor 15, reaches the desired value, the breakdown voltage of Zener diode 16 is reached, forward biasing diode 17 and causing the voltage at the base of transistor 4 to decrease, turning on transistor 4, on the average, longer and to a higher current level. This action reduces the base drive from and thus the on duration of transistor 9. Thus the energy being stored in the inductor is reduced to a value to equalize the energy being transferred to and from the capacitor 15. If no energy were being transferred from the capacitor 15, that is, if the output were unloaded, when the desired stored output voltage exists in capacitor 15, the circuit does not oscillate and transistor 9 is turned off, while transistor 4 is turned on. The output voltage regulator circuit regulates the output voltage with respect to the common positive bus, thus changes in battery voltage are compensated for by this circuit.

When a voltage of slightly greater magnitude (approximately ½ volt) than the normal output voltage is applied at the output terminals 20 and 21, such as might be supplied by an external AC to DC power supply commonly used to power small handheld appliances when AC current is available, the battery charging circuit comprising transistor 8 and resistors 12 and 18, causes the battery to charge. When the output voltage regulator circuit causes the oscillations to cease, the voltage at node 22 is approximately zero volts. When the slightly higher voltage from an external AC to DC power supply is applied to the output terminals, the voltage at node 22 correspondingly attains a value slightly negative, causing transistor 8 to saturate. Transistor 8 then provides a charging path to the battery through current limiting resistor 18.

Having described the invention in connection with certain specific embodiments thereof, it is to be understood that further modifications may now suggest themselves to those skilled in the art, for instance: (1) Diodes and transistors of opposite polarity from those indicated could be substituted for those indicated; (2) Darlington pairs or other semiconductor devices could be substituted for the transistors indicated; (3) A tapped inductor could be utilized to obtain a plurality of output voltages; (4) Different rectifier circuits, such as the well known voltage doubler, could be utilized instead of the rectifier circuit depicted; (5) A resistor could be utilized instead of diode 5. It is intended that any and all such modifications fall within the scope of the appended claims.

What is claimed is:

1. An electrical circuit comprising: an input, an output, voltage responsive means connected to said input and normally responsive to the application of a first electrical potential thereto to change successively between first and second electrical conditions thereby to develop a second electrical potential at said output, said second electrical potential being a higher potential than said first electrical potential and control means, interconnecting said voltage responsive means and said output, for interrupting said successive change when the potential at said output rises to a first predetermined level and for conducting current from said output to said input when the potential at said output is at a second predetermined level higher than said first predetermined level.

2. The circuit according to claim 1, further including a battery coupled to said input.

3. The circuit according to claim 2, wherein said battery is a rechargeable battery.

4. The circuit according to claim 1, wherein said first predetermined level is a DC potential.

5. An electronic circuit comprising:
   an input and an output, electrical energy storage means interconnected with said output, voltage responsive means connected to said input and normally responsive to the application of a predetermined potential thereto to change successively between first and second electrical conditions thereby to develop an electrical potential across said energy storage means, and control means interconnecting said voltage responsive means, said storage means and said output, effective when the potential at said output rises to a predetermined level to interrupt said successive change and, when the potential at said output is at a level higher than said predetermined level to conduct current therethrough to said input.

6. The circuit according to claim 5, furthering including a battery coupled to said input.

7. The circuit according to claim 6, wherein said battery is a rechargeable battery.

8. The circuit according to claim 5, wherein said predetermined level is greater than said predetermined potential.

9. In combination with a DC to DC power supply wherein a battery is usually connected to the circuit input and wherein a DC output voltage, higher than battery voltage, is derived at a circuit output, the improvement which comprises:
   (a) detecting means for detecting when a predetermined voltage higher than the normal output voltage is applied to the circuit output, and
   (b) conducting means for conducting such a detected higher voltage to the input of the circuit whereby a rechargeable battery connected to the circuit input will be caused to charge.

10. The apparatus as defined in claim 9, wherein said conducting means comprises a semiconductor conducting means.

11. The apparatus as defined in claim 10, wherein said semiconductor conducting means comprises a transistor whose emitter is connected by circuit means to said circuit input, whose collector is connected by collector circuit means to said circuit output and whose base is connected by base circuit means to said detecting means.

12. The apparatus as defined in claim 11, wherein said collector circuit means comprises at least one resistor.

13. The apparatus as defined in claim 9, wherein said detecting means comprises a Zener diode connected between said circuit output and said conducting means.

14. The apparatus as defined in claim 11, wherein said detecting means comprises a Zener diode connected between said circuit output and said base circuit means.

15. The apparatus as defined in claim 14, wherein said base circuit means comprises at least one resistor and wherein said collector circuit means comprises at least one resistor.

16. A DC to DC power supply circuit comprising:
   (a) a resistive device;
   (b) a first semiconductor means for controlling the current flowing through said resistive device;
   (c) a single-winding inductor;
   (d) a second semiconductor means for controlling the current flowing through said single-winding inductor;
   (e) circuit means coupling the control element of said second semiconductor means with said resistive device;
   (f) a feedback loop comprising at least one feedback capacitor coupling the control element of said first semiconductor means with said inductor;
   (g) converter means connected to said inductor for converting the energy stored in said inductor during the operation of said first and second semiconductor means into direct current available at the circuit output;
   (h) output voltage regulator means connected to said circuit output and to the control element of said first semiconductor means for regulating the level of the direct current voltage developed at said circuit output;
   (i) first circuit means connecting said first semiconductor means and its resistive device in parallel with said second semiconductor means and its inductor to a direct current source applied at the circuit input;
   (j) second circuit means connecting one element of said input and one element of said output to a circuit common; and
   (k) third circuit means for coupling a voltage applied at said circuit output to said circuit input when the voltage applied is greater than the level of direct current voltage normally developed at said circuit output.

17. A DC to DC power supply circuit as defined in claim 16, wherein said third circuit means is a semiconductor means of the same conductivity type as said second semiconductor means, wherein the control element of said third semiconductor means is connected by circuit means to said output voltage regulator means and wherein the current carrying elements of said third semiconductor means are resistively connected between said circuit output and said circuit input.

18. A DC to DC power supply circuit as defined in claim 16, wherein said first semiconductor means is of complementary conductivity type to said second semiconductor means.

19. A DC to DC power supply circuit as defined in claim 18, wherein said first semiconductor means is a PNP transistor and said second semiconductor means is an NPN transistor.

20. A DC to DC power supply circuit as defined in claim 18, wherein said first semiconductor means is an NPN transistor and said second semiconductor means is a PNP transistor.

21. A DC to DC power supply circuit as defined in claim 17, wherein said first semiconductor means is a PNP transistor and said second and third semiconductor means are NPN transistors.

22. A DC to DC power supply circuit as defined in claim 17, wherein said first semiconductor means is an NPN transistor and said second and third semiconductor means are PNP transistors.

23. A DC to DC power supply circuit as defined in claim 18, wherein said positive feedback loop consists of a resistor and a capacitor connected in series and with the capacitor connected to the control element of said first semiconductor means.

24. A DC to DC power supply circuit as defined in claim 23, wherein unidirectional conductive means is connected in parallel with said capacitor to improve the switching time of the circuit.

25. A DC to DC power supply circuit as defined in claim 18, wherein unidirectional conductive means is connected to the control element of said first semiconductor means and to the circuit input to limit the extent to which the semiconductor junction of said control element becomes reverse biased during circuit operation.

26. A DC to DC power supply circuit as defined in claim 25, wherein said unidirectional conductive means is at least one semiconductor diode.

27. A DC to DC power supply circuit as defined in claim 18, wherein said output voltage regulator circuit means comprises at least one Zener diode.

28. A DC to DC power supply circuit as defined in claim 18, wherein said output voltage regulator means comprises at least one Zener diode and at least one unidirectional conductive means connected in series.

29. A DC to DC power supply circuit as defined in claim 18, wherein said converter means comprises a unidirectional conductive means and a capacitor connected in series between said inductor and said circuit common thereby producing the output voltage of the circuit between the junction of said capacitor and said unidirectional conductive means and said circuit common.

30. A DC to DC power supply circuit as defined in claim 17, wherein said output voltage regulator means comprises at least one Zener diode and at least one unidirectional conductive means connected in series and wherein the control element of said third semiconductor means is resistively coupled to the junction between said Zener diode and said unidirectional conductive means.

31. A DC to DC power supply circuit as defined in claim 18, wherein said circuit means coupling the control element of said second semiconductor means with said resistive load comprises at least one resistor.

32. A DC to DC power supply circuit as defined in claim 16, wherein said first semiconductor means is of the same conductivity type as said second semiconductor means.

33. A DC to DC power supply circuit as defined in claim 32, wherein said first semiconductor means and said second semiconductor means are each a PNP transistor.

34. A DC to DC power supply circuit as defined in claim 32, wherein said first semiconductor means and said second semiconductor means are each an NPN transistor.

35. A DC to DC power supply circuit as defined in claim 17, wherein said first semiconductor means, said second semiconductor means and said third semiconductor means are each a PNP transistor.

36. A DC to DC power supply circuit as defined in claim 17, wherein said first semiconductor means, said second semiconductor means and said third semiconductor means are each an NPN transistor.

37. A DC to DC power supply circuit as defined in claim 32, wherein unidirectional conductive means is connected in parallel with said feedback capacitor to improve the switching time of the circuit.

38. A DC to DC power supply circuit as defined in claim 32, wherein unidirectional conductive means is connected to the control element of said first semiconductor means and to the circuit input to limit the extent to which the semiconductor junction of said control element becomes reverse biased during circuit operation.

39. A DC to DC power supply circuit as defined in claim 32, wherein said output voltage regulator circuit means comprises at least one Zener diode.

40. A DC to DC power supply circuit as defined in claim 32, wherein said output voltage regulator means comprises at least one Zener diode and at least one resistor connected in series.

41. A DC to DC power supply circuit as defined in claim 32, wherein said output voltage regulator means comprises at least one Zener diode, at least one resistor and at least one unidirectional means connected in series.

42. A DC to DC power supply circuit as defined in claim 32, wherein said converter means comprises a unidirectional conductive means and a capacitor connected in series between said inductor and said circuit thereby producing the output voltage of the circuit between the junction of said capacitor and said unidirectional conductive means and said circuit common.

43. A DC to DC power supply as defined in claim 17, wherein said output voltage regulator means comprises at least one Zener diode connected to said circuit output, unidirectional conductive means connected to said Zener diode and at least one resistor connected between said unidirectional conductive means and the said control element of said first semiconductor means wherein the control element of said third semiconductor means is resistively coupled to the junction between said Zener diode and said unidirectional conductive means.

44. The circuit according to claim 16, wherein the direct current source is a battery coupled to said input.

45. The circuit according to claim 44, wherein said battery is a rechargeable battery.

* * * * *